(12) United States Patent
Higgins

(10) Patent No.: US 6,478,213 B1
(45) Date of Patent: Nov. 12, 2002

(54) FLUXLESS FABRICATION OF A MULTI-TUBULAR STRUCTURE

(75) Inventor: Scott Higgins, Tucson, AZ (US)

(73) Assignee: Raytheon Company, Lexington, MA (US)

(*) Notice: Subject to any disclaimer, the term of this patent is extended or adjusted under 35 U.S.C. 154(b) by 0 days.

(21) Appl. No.: 09/872,140

(22) Filed: Jun. 1, 2001

(51) Int. Cl.[7] .............................................. B21D 39/04
(52) U.S. Cl. ........................ 228/133; 228/126; 228/245
(58) Field of Search ................................. 228/126, 131, 228/132, 133, 245, 246, 254, 56.3

(56) References Cited

U.S. PATENT DOCUMENTS

| | | | |
|---|---|---|---|
| 3,604,104 A | * 9/1971 | Glasgow | 29/487 |
| 3,945,215 A | * 3/1976 | Johnson et al. | 62/55 |
| 5,042,847 A | * 8/1991 | Lasecki et al. | 285/138 |
| 5,071,174 A | * 12/1991 | Griffin et al. | 285/173 |
| 5,439,257 A | * 8/1995 | Williamson | 285/286 |
| 5,695,111 A | * 12/1997 | Nanis et al. | 228/206 |
| 5,871,140 A | * 2/1999 | McCrink | 228/132 |

FOREIGN PATENT DOCUMENTS

| | | | |
|---|---|---|---|
| JP | 57-206517 | * 12/1982 | |
| JP | 3-71973 | * 3/1991 | |

* cited by examiner

Primary Examiner—M. Alexandra Elve
Assistant Examiner—Len Tran

(57) ABSTRACT

A multi-tubular structure is fabricated without the use of a brazing flux by assembling a brazing assembly having no flux and having an inner tube, a bottom outer tube overlying the inner tube, and a top outer tube overlying the inner tube. The top outer tube and the bottom outer tube are coaxial along a tube axis but longitudinally spaced apart along the tube axis. A mass of a braze material overlies the inner tube and resides within the flared upper end of the bottom outer tube. The assembly is brazed in a vacuum by heating the braze material to a temperature above the braze-material melting point, and simultaneously moving the top outer tube and the bottom outer tube together along the tube axis so that their facing ends lie adjacent to each other.

18 Claims, 4 Drawing Sheets

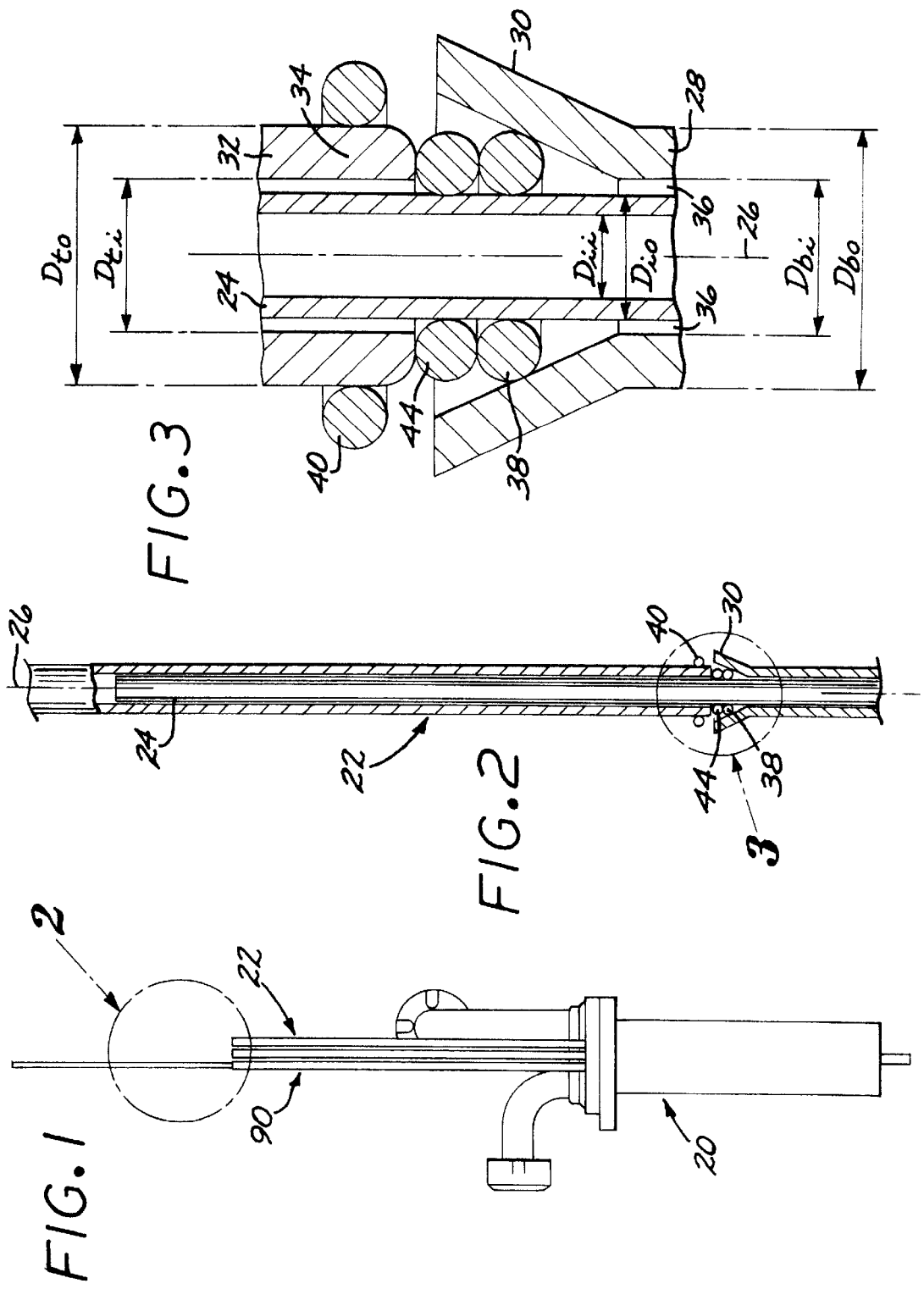

FLUXLESS FABRICATION OF A MULTI-TUBULAR STRUCTURE

This invention was made with United States Government support under contract No. DASG60-90-C-0166, awarded by the Department of the Army. The United States Government has certain rights in this invention.

This invention relates to the fabrication of a structure by brazing from several tubes.

BACKGROUND OF THE INVENTION

The production joining of small-sized mechanical elements can pose challenging problems. In an example, it is necessary to join three separate gas tubes during the construction of a Joule-Thomson cryostat. An inner tube lies concentrically within two end-to-end outer tubes. The tubes are joined together to form the multi-tubular structure. The brazing operation must form a gas-tight seal between the inner tube and the outer tubes, and must join the outer tubes in an end-to-end fashion. In existing practice, the brazing is performed in multiple steps by a highly skilled brazing torch operator.

Brazing is normally conducted using a flux to remove oxide that is present on the surfaces to be joined and to prevent the formation of additional oxides during the brazing operation. The braze metal is melted in the presence of the flux, wetted to the surfaces of the tubes, and then solidified to join the tubes. The flux is thereafter removed.

Brazing works well in many situations, but has limitations. In the case of the joining of three tubes for the Joule-Thomson cryostat, in one instance the outer diameter of the inner tube is about 0.019 inch, and the inner diameter of the outer tubes is about 0.022 inch. Because of the tight fit between the inner tube and the outer tube and the fact that the brazing produces a blind-end annular space between the tubes, it is virtually impossible to remove all of the flux from the annular space after brazing is complete.

There is a need for another approach to forming the multi-tubular structure for the Joule-Thomson cryostat, as well as for similar applications that arise in other production operations. The present invention fulfills this need, and further provides related advantages.

SUMMARY OF THE INVENTION

The present invention provides a method of fabricating a multi-tubular structure that is structurally sound. The method uses brazing, but avoids the use of a brazing flux. It is therefore not necessary to remove any brazing flux from the tight space between the inner tube and the outer tubes at the completion of the brazing operation. The brazing of the three tubes together is accomplished in a single step rather than the multi-step process previously used. It is accomplished in a controlled fashion using specially designed tooling, and requires less skill in the personnel performing the brazing. The present approach also reduces the fabrication time and cost, and is more reproducible.

In accordance with the invention, a method of fabricating a multi-tubular structure without the use of a brazing flux comprises the steps of providing an inner tube, providing a bottom outer tube having a flared upper end, providing a top outer tube, and providing a mass of braze material having a braze-material melting point. A brazing assembly having no flux is assembled with the inner tube, the bottom outer tube overlying the inner tube, and the top outer tube overlying the inner tube. The top outer tube and the bottom outer tube are coaxial along a tube axis but longitudinally spaced apart along the tube axis. In the brazing assembly, the mass of braze material overlies the inner tube and resides within the flared upper end of the bottom outer tube. The method further includes brazing the brazing assembly in a vacuum. The step of brazing includes the steps of heating the braze material to a temperature above the braze-material melting point, and simultaneously moving the top outer tube and the bottom outer tube together along the tube axis so that their facing ends lie adjacent to each other. The heating is preferably performed inductively.

In the case where the inner tube, the bottom outer tube, and the bottom outer tube are portions of a cryostat, these elements are each made of a material selected from the group consisting of stainless steel and a copper-nickel alloy. The braze material is desirably an alloy of gold and nickel for these materials of construction. In the cryostat assembly of most interest, a difference between an outer diameter of the inner tube and an inner diameter of the top outer tube is less than about 0.004 inch.

The mass of braze material preferably comprises at least one ring of the braze material. More preferably, the mass of braze material comprises at least one ring of the braze material having an inner ring diameter of about the outer diameter of the inner tube. Yet more preferably, the mass of braze material comprises a first ring of the braze material having an inner first ring diameter of about the outer diameter of the inner tube, the first ring of the braze material residing within the flare of the bottom outer tube after the step of assembling; and a second ring of the braze material having an inner second ring diameter of about the outer diameter of the top outer tube and overlying a lower portion of the top outer tube after the step of assembling. Most preferably, the mass of braze material comprises a first ring of the braze material having an inner first ring diameter of about the outer diameter of the inner tube, the first ring of the braze material residing within the flare of the bottom outer tube after the step of assembling; a second ring of the braze material having an inner second ring diameter of about the outer diameter of the top outer tube and overlying a lower portion of the top outer tube after the step of assembling; and a third ring of the braze material having an inner third ring diameter of about the outer diameter of the inner tube, the third ring of the braze material residing within the flare of the bottom outer tube after the step of assembling.

The present approach desirably uses a brazing fixture that holds the inner tube stationary, holds one of the outer tubes (e.g., the bottom outer tube) stationary, and allows the other of the outer tubes (e.g., the top outer tube) to move vertically downwardly. The vertical downward motion brings the lower end of the top outer tube into abutting end-to-end contact with the flared end of the bottom outer tube, with the braze metal lying between the top outer tube and the bottom outer tube. Upon melting of the braze metal in vacuum, the molten braze metal wets the adjacent ends of the outer tubes and also the radially inwardly portion of the inner tube. Upon cooling, the three tubes are joined together.

This process requires attention to alignment and set-up, but the actual brazing is conducted by lower-skilled personnel than required for other brazing approaches. The result is a sound, reproducible braze without any flux and without the need to later clean away residual flux from a tightly confined annular volume. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is an elevational view of a Joule-Thomson cryostat;

FIG. 2 is a detail of FIG. 1 in region 2, during fabrication of the cryostat;

FIG. 3 is a detail of FIG. 2 in region 3, showing the multi-tubular brazing assembly;

DETAILED DESCRIPTION OF THE INVENTION

Figure 4:
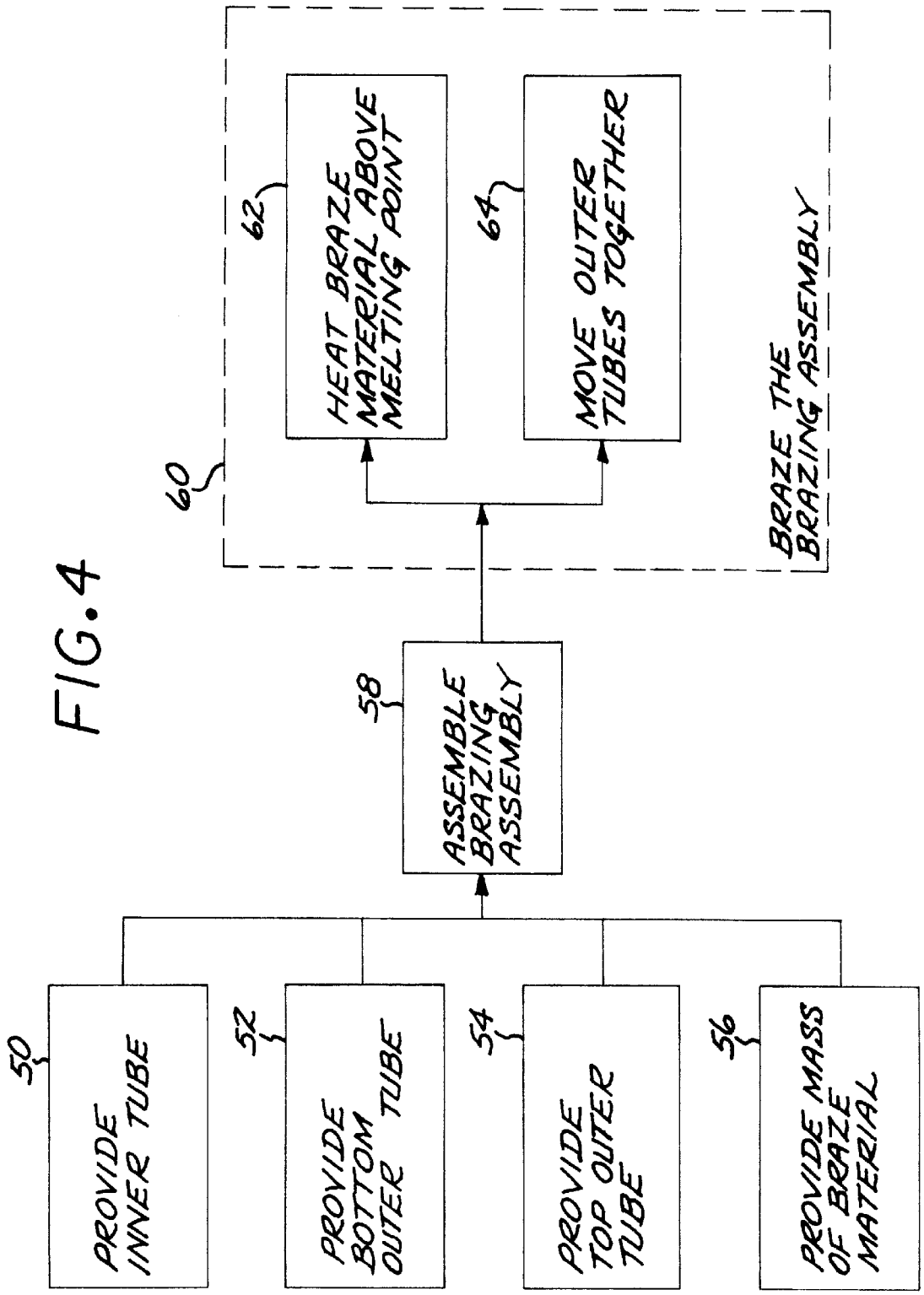
FIG. 4 is a block flow diagram of the fabrication method.

FIG. 1 illustrates a Joule-Thomson cryostat 20. A multi-tubular structure 22 extends from one end of the cryostat 20. The present invention is concerned with the fabrication of the multi-tubular structure 22. The operation and structure, other than the fabrication of the multi-tubular structure, of the Joule-Thomson cryostat are known in the art and do not form a part of the present invention.

The multi-tubular structure is shown in greater detail in FIG. 2 and even greater detail in FIG. 3, during the fabrication procedure. A cylindrical inner tube 24, sometimes called the cooldown/sustain tube, has a tube axis 26. Two cylindrical outer tubes overlie the inner tube 24. A cylindrical bottom outer tube 28, sometimes called the warm flange inlet tube, has a flared upper end 30. A cylindrical top outer tube 32, sometimes called the inlet filter tube, is coaxial with the bottom outer tube 28 along the tube axis 26. The top outer tube 32 has a lower end 34 that is in facing relation with the flared upper end 30 of the bottom outer tube 28, so as to be received within the flare of the flared upper end 30 of the bottom outer tube 28. The bottom outer tube 28 and the top outer tube 32 are coaxial with the inner tube 24 along the tube axis 26.

The inner tube 24 has an outer diameter $D_{io}$ and an inner diameter $D_{ii}$. The bottom outer tube 28 has an outer diameter $D_{bo}$ and an inner diameter $D_{bi}$. The top outer tube 28 has an outer diameter $D_{to}$ and an inner diameter $D_{ti}$. Desirably, $D_{bo}$ and $D_{to}$ are about equal to each other, and $D_{bi}$ and $D_{ti}$ are about equal to each other. The following discussion of the preferred embodiment will utilize these equalities of dimension. An annular gap 36 of dimension $(D_{bi}-D_{io})$, which is about equal to $(D_{ti}-D_{io})$, lies between the inner tube 24 and the bottom outer tube 28. In a case of particular interest, the dimension of the annular gap 36 $(D_{bi}-D_{io})$ is less than about 0.005 inch, and typically from about 0.001 to about 0.005 inch. If a conventional brazing approach were used, after brazing this gap 36 would contain a residual flux at the end of the long annular gap 36. The residual flux would be extremely difficult to remove during a post-brazing cleanout process.

FIG. 4 depicts in block diagram form a preferred approach for practicing the invention. The inner tube 24 is provided, numeral 50; the bottom outer tube 28 is provided, numeral 52; and the top outer tube 32 is provided, numeral 54. Additionally, a mass of a braze material is provided, numeral 56. These elements are assembled together as a brazing assembly, numeral 58.

The braze material is selected according to the composition of the tubes 24, 28, and 32. In the preferred embodiment, the tubes 24, 28, and 32 are all made of either stainless steel or a 50:50 copper-nickel alloy. For these cases, the braze material is preferably an alloy of 82 percent by weight of gold, 18 percent by weight of nickel.

The braze material is preferably provided as preformed rings that slide over and fit around the tubes so that they are generally held in place during the brazing operation. The ring configuration also ensures that braze material will be uniformly available around the entire circumference of the subsequently formed braze joint. A first ring 38 of the braze material has an inner first ring diameter of about the outer diameter $D_{io}$ of the inner tube 24, but slightly larger so that it slides over the inner tube 24. The first ring 38 of the braze material resides within the flare of the flared upper end 30 of the bottom outer tube after the step of assembling 58. A second ring 40 of the braze material has an inner second ring diameter of about the outer diameter $D_{to}$ of the top outer tube 32, but slightly larger so that it slides over the top outer tube 32. The second ring 40 overlies the lower portion 34 of the top outer tube 32 after the step of assembling 58. A third ring 44 of the braze material has an inner third ring diameter of about the outer diameter $D_{io}$ of the inner tube 24, but slightly larger so that it slides over the inner tube 24. The third ring 44 of the braze material resides within the flare of the flared upper end 30 of the bottom outer tube 28 after the step of assembling 58.

The use of the described three rings of braze material 38, 40, and 44 has been found to be most suitable, but fewer or more rings of the braze material may be used as necessary depending upon the volume of braze material that is required and the dimensions of the tubes. The first ring 38 is necessary. The second ring 40 is desirably present, and the third ring 44 and additional rings are used as needed to supply an additional volume of braze material.

Figure 5:
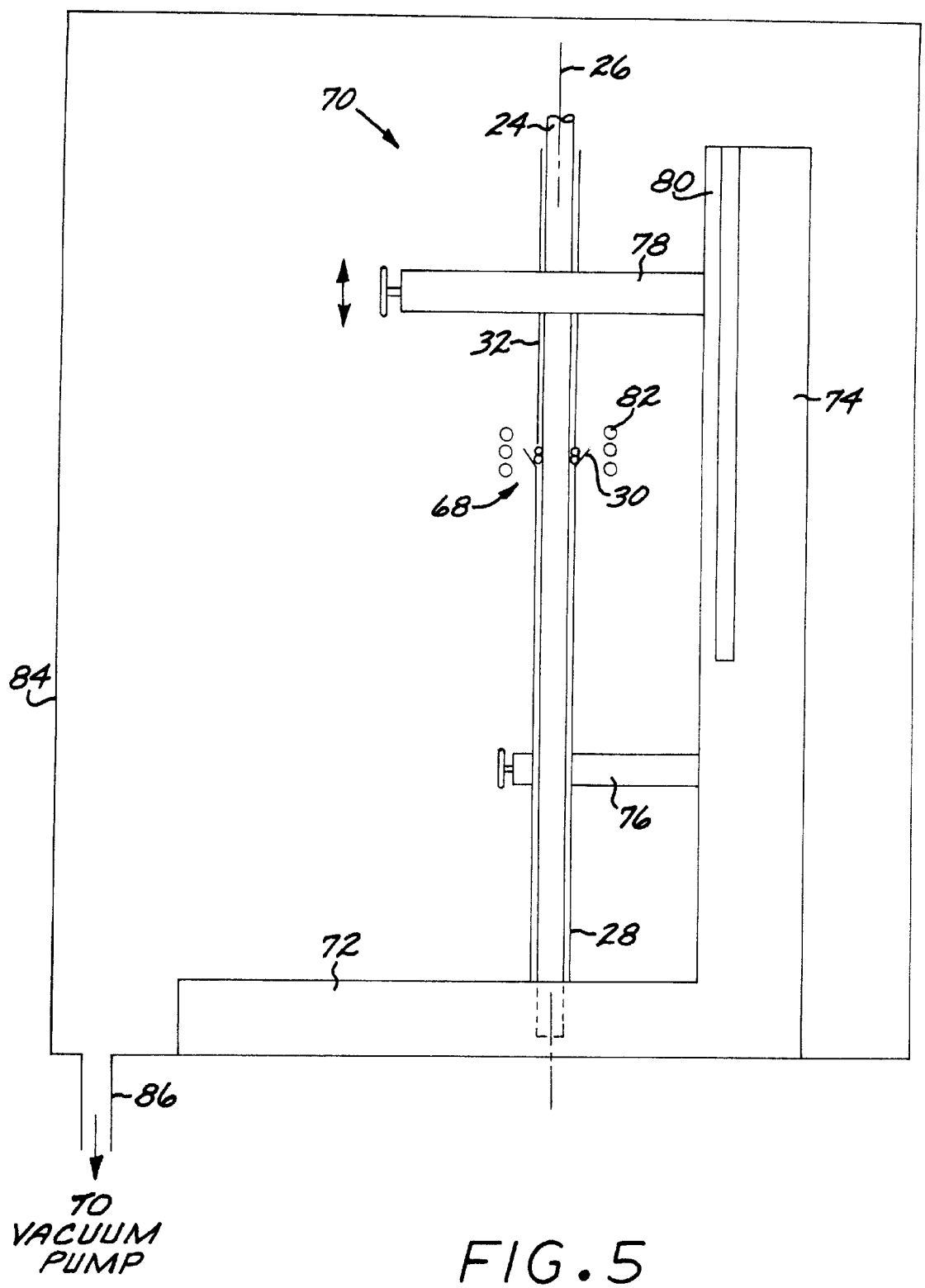
FIG. 5 is a schematic elevational view of a brazing fixture used to prepare the multi-tubular structure with the brazing assembly mounted therein, and its placement in a vacuum chamber for brazing.

To facilitate the alignment and brazing operation, the tubes 24, 28, and 32, and the rings 38, 40, and 44 are arranged as in FIG. 3 to form a brazing assembly 68, and mounted in a brazing fixture 70 schematically illustrated in FIG. 5. The brazing fixture 70 includes a stationary base 72 and a stationary vertical support 74. The inner tube 24 is supported stationary on the base 72 with the tube axis 26 extending in the vertical direction. A stationary support arm 76 mounted to the vertical support 74 holds the bottom outer tube 28 stationary and coaxial with the inner tube 24, and with the flared upper end 30 pointed upwardly. The top outer tube 32 is supported in a sliding arm 78 that is slidably mounted for vertical motion to a slider 80 on the vertical support 74. The top outer tube 32 is coaxial with the inner tube 24. The rings 38, 40, and 44 are arranged as in FIG. 3, so that the lower portion 34 of the top outer tube 32 presses downwardly against the rings 38 and 44 under the force of gravity.

A heater 82, in this case an induction coil, is placed around the flared upper end 30, lower portion 34, and rings 38, 40, and 44. The induction coil is powered by an induction power supply, not shown. A resistance heater or other operable heater may be used instead of the induction coil.

The brazing assembly 68, fixture 70, and heater 82 are placed into a vacuum chamber 84. The vacuum chamber 84 is evacuable through a vacuum port 86 by a vacuum pump (not shown). For the present processing, it is preferred that the vacuum within the vacuum chamber 84 be less than about $1 \times 10^{-4}$ Torr.

Figure 6:
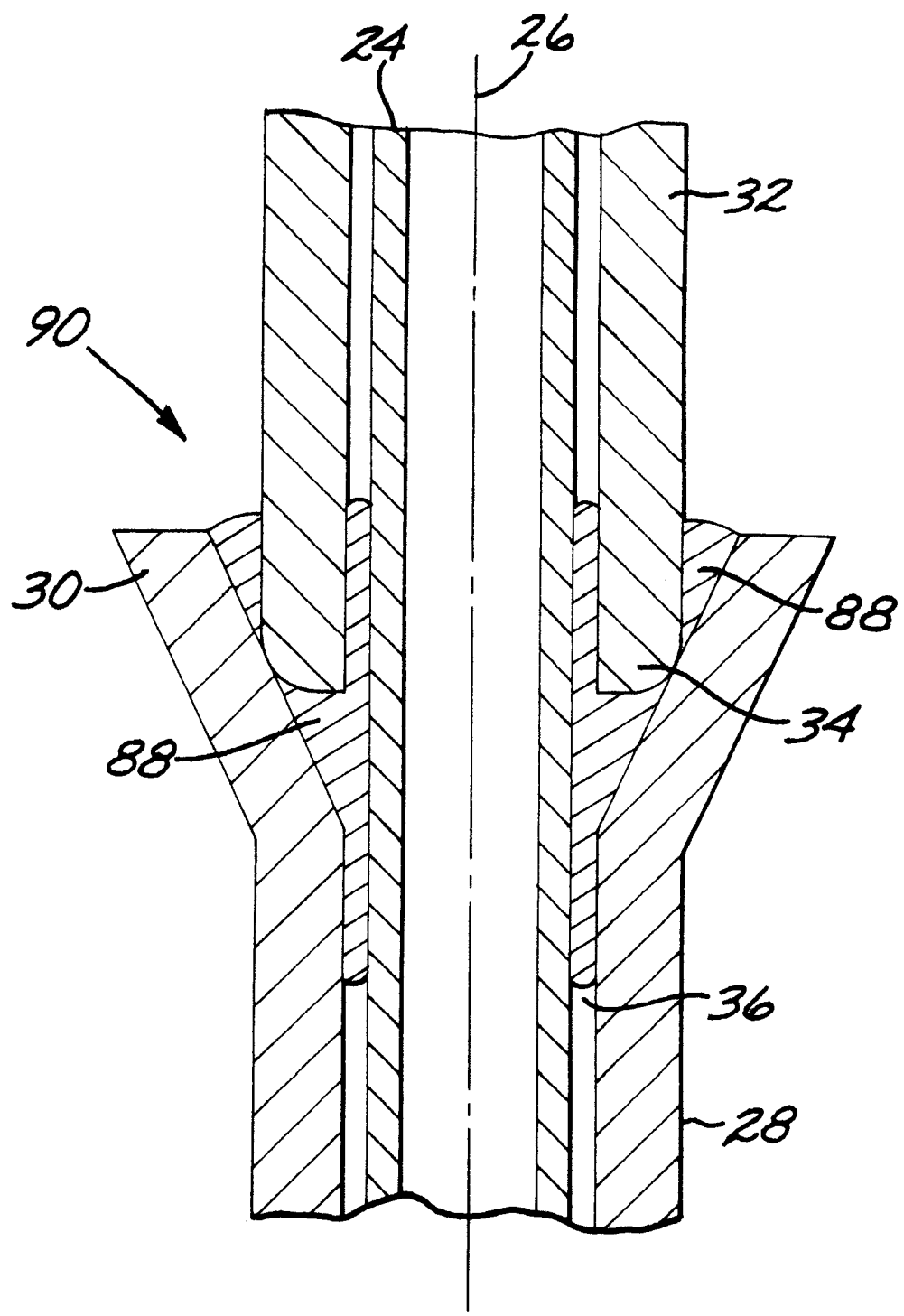
FIG. 6 is a view like that of FIG. 3, after brazing is completed.

The brazing assembly 68 is brazed in the vacuum, numeral 60 of FIG. 4. Brazing is accomplished by heating the braze material to a temperature above the braze-material melting point, numeral 62, and simultaneously moving the top outer tube 32 and the bottom outer tube 28 together along the tube axis 26 so that their facing ends lie adjacent to each other. This controlled movement is accomplished by the fixture 70. When the rings 38, 40, and 44 melt, the top outer tube 32 is no longer supported in place by the rings 38 and 44, so that it slowly moves downwardly as the sliding arm 78 moves downwardly on the slider 80. (The sliding distance is only about 1/10 of an inch in the preferred approach.) The melted braze material is filled into the cavity defined by the flared upper end 30 and the inner tube 24. The power to the heater 82 is thereafter discontinued. The braze metal solidifies to form a braze mass 88 that bonds together the inner tube 24, the bottom outer tube 28, and the top outer tube 32, and fills and plugs the annular gap 36, as shown in the final brazed assembly 90 of FIG. 6.

The combination of the geometry of the brazing assembly 68, the sliding movement, and the vacuum accomplishes the brazing of the tubes in a reliable, reproducible manner. No flux is used, and there is no need for the cleaning and removal of flux from the final brazed assembly 90.

The present approach has been reduced to practice in the manner described herein for several assemblies. The final brazed assembly was completed in about 2 hours, as compared with about 1–2 days required for a conventional manual brazing approach. The final brazed assemblies 90 were variously subjected to a 10,500 pounds per square inch internal pressure text, were bent to tight radii near the brazed joint, were viewed by X-ray analysis, and were metallurgically sectioned. The tests determined that the braze joints were sound and met mechanical requirements.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method of fabricating a multi-tubular structure without the use of a brazing flux, comprising the steps of:
   providing an inner tube;
   providing a bottom outer tube having a flared upper end;
   providing a top outer tube;
   providing a mass of braze material having a braze-material melting point;
   assembling a brazing assembly having no flux and having a brazing fixture with a movable portion and a stationary portion,
   the inner tube mounted to the stationary portion of the brazing fixture,
   the bottom outer tube overlying the inner tube,
   the top outer tube overlying the inner tube, wherein the top outer tube and the bottom outer tube are coaxial along a tube axis but longitudinally spaced apart along the tube axis, and wherein one of the bottom outer tube and the top outer tube is mounted to the movable portion of the brazing fixture and the other is mounted to the stationary portion of the brazing fixture, and
   the mass of braze material overlying the inner tube and residing within the flared upper end of the bottom outer tube;
   brazing the brazing assembly in a vacuum, the step of brazing including the steps of heating the braze material to a temperature above the braze-material melting point, and simultaneously moving the movable portion of the brazing fixture so the top outer tube and the bottom outer tube move toward each other along the tube axis toward an adjacent, end to end relation with each other.

2. The method of claim 1, wherein the inner tube, the bottom outer tube, and the bottom outer tube are portions of a cryostat.

3. The method of claim 1, wherein the inner tube, the bottom outer tube, and the bottom outer tube are each made of a material selected from the group consisting of stainless steel and a copper-nickel alloy.

4. The method of claim 1, wherein a difference between an inner diameter of the bottom outer tube and an outer diameter of the inner tube is less than about 0.005 inch.

5. The method of claim 1, wherein the braze material is an alloy of gold and nickel.

6. The method of claim 1, wherein the mass of braze material comprises at least one ring of the braze material.

7. The method of claim 1, wherein the mass of braze material comprises at least one ring of the braze material having an inner ring diameter of about the outer diameter of the inner tube.

8. The method of claim 1, wherein the mass of braze material comprises
   a first ring of the braze material having an inner first ring diameter of about the outer diameter of the inner tube, the first ring of the braze material residing within the flare of the bottom outer tube after the step of assembling, and
   a second ring of the braze material having an inner second ring diameter of about the outer diameter of the top outer tube and overlying a lower portion of the top outer tube after the step of assembling.

9. The method of claim 1, wherein the mass of braze material comprises
   a first ring of the braze material having an inner first ring diameter of about the outer diameter of the inner tube, the first ring of the braze material residing within the flare of the bottom outer tube after the step of assembling,
   a second ring of the braze material having an inner second ring diameter of about the outer diameter of the top outer tube and overlying a lower portion of the top outer tube after the step of assembling, and
   a third ring of the braze material having an inner third ring diameter of about the outer diameter of the inner tube, the third ring of the braze material residing within the flare of the bottom outer tube after the step of assembling.

10. The method of claim 1, wherein the step of heating includes the step of heating the brazing material inductively.

11. The method of claim 1, wherein the tube axis is vertical.

12. The method of claim 11, wherein the step of moving includes the step of allowing the outer tubes to move toward each other in an end-to-end abutting fashion under the force of gravity.

13. A method of fabricating a multi-tubular structure without the use of a brazing flux, comprising the steps of:
   providing an inner tube;
   providing a bottom outer tube having a flared upper end;
   providing a top outer tube;
   providing a mass of braze material having a braze-material melting point, the mass of braze material being in the form of a ring of the braze material;

assembling a brazing assembly having no flux and having the inner tube, the bottom outer tube overlying the inner tube, the top outer tube overlying the inner tube, wherein the top outer tube and the bottom outer tube being coaxial along a tube axis but longitudinally spaced apart along the tube axis, and the ring of the braze material overlying the inner tube and residing within the flared upper end of the bottom outer tube, the step of assembling further including the steps of:

providing a brazing fixture having a stationary portion and a movable portion, mounting the inner tube stationary in the stationary portion of the brazing fixture with the tube vertical axis, mounting the bottom outer tube in the stationary portion of the brazing fixture, and mounting the top outer tube in the moveable portion of the brazing fixture so as to be movable parallel to the tube axis, so that the top outer tube and the bottom outer tube may move relative to each other along the tube axis; and brazing the brazing assembly in a vacuum, the step of brazing including the steps of heating the braze material to a temperature above the braze-material melting point, and simultaneously moving the movable portion of the brazing fixture so the top outer tube moves along the tube axis downwardly toward an abutting end to end relation with the bottom outer tube under the force of gravity.

14. The method of claim 13, wherein the inner tube, the bottom outer tube, and the bottom outer tube are portions of a cryostat.

15. The method of claim 13, wherein a difference between an inner diameter of the bottom outer tube and an outer diameter of the inner tube is less than about 0.005 inch.

16. The method of claim 13, wherein the mass of braze material comprises a first ring of the braze material having an inner first ring diameter of about the outer diameter of the inner tube, the first ring of the braze material residing within the flare of the bottom outer tube after the step of assembling, and a second ring of the braze material having an inner second ring diameter of about the outer diameter of the top outer tube and overlying a lower portion of the top outer tube after the step of assembling.

17. The method of claim 12, wherein the mass of braze material comprises a first ring of the braze material having an inner first ring diameter of about the outer diameter of the inner tube, the first ring of the braze material residing within the flare of the bottom outer tube after the step of assembling, a second ring of the braze material having an inner second ring diameter of about the outer diameter of the top outer tube and overlying a lower portion of the top outer tube after the step of assembling, and a third ring of the braze material having an inner third ring diameter of about the outer diameter of the inner tube, the third ring of the braze material residing within the flare of the bottom outer tube after the step of assembling.

18. The method of claim 13, wherein the step of heating includes the step of heating the brazing material inductively.

* * * * *